Figure 4:
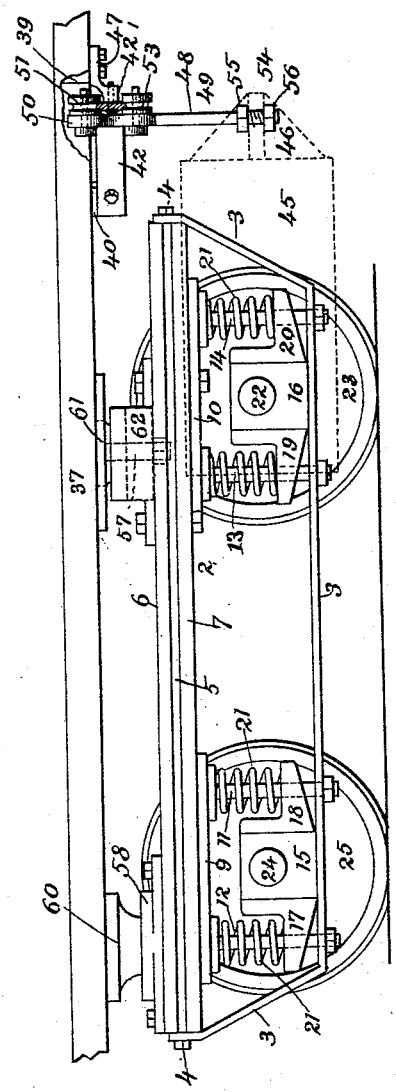

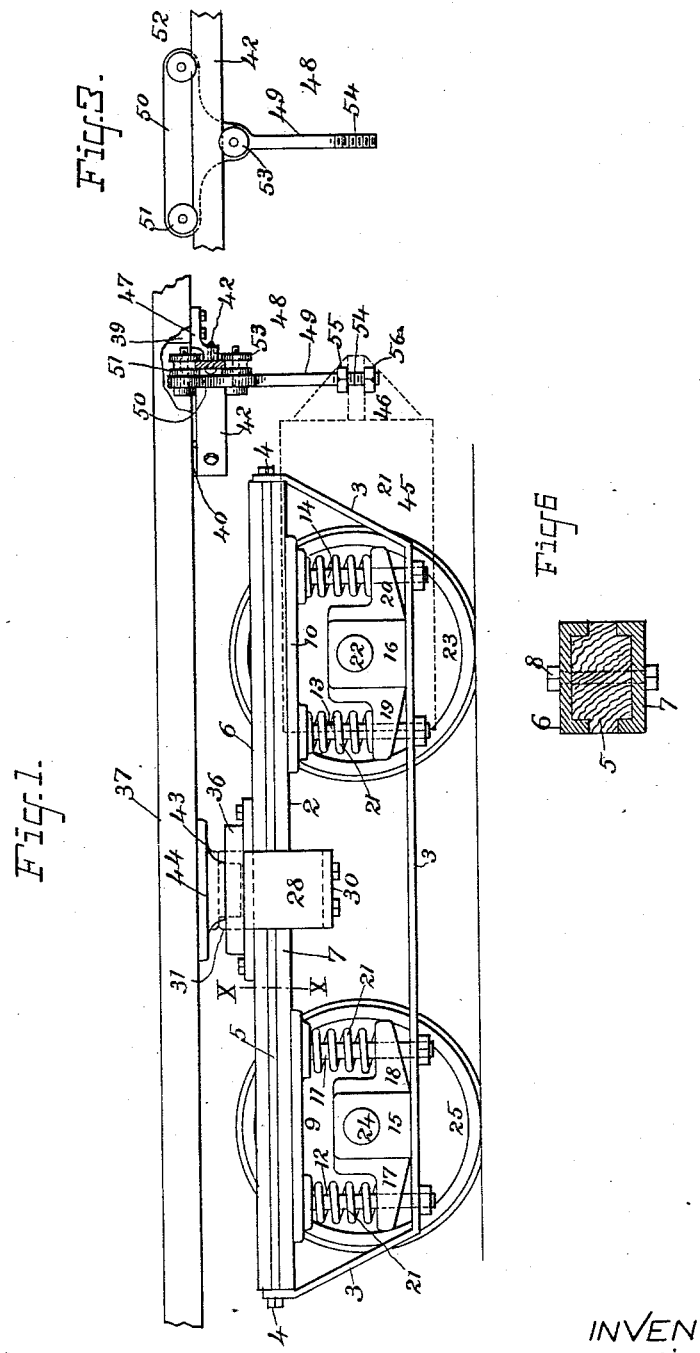

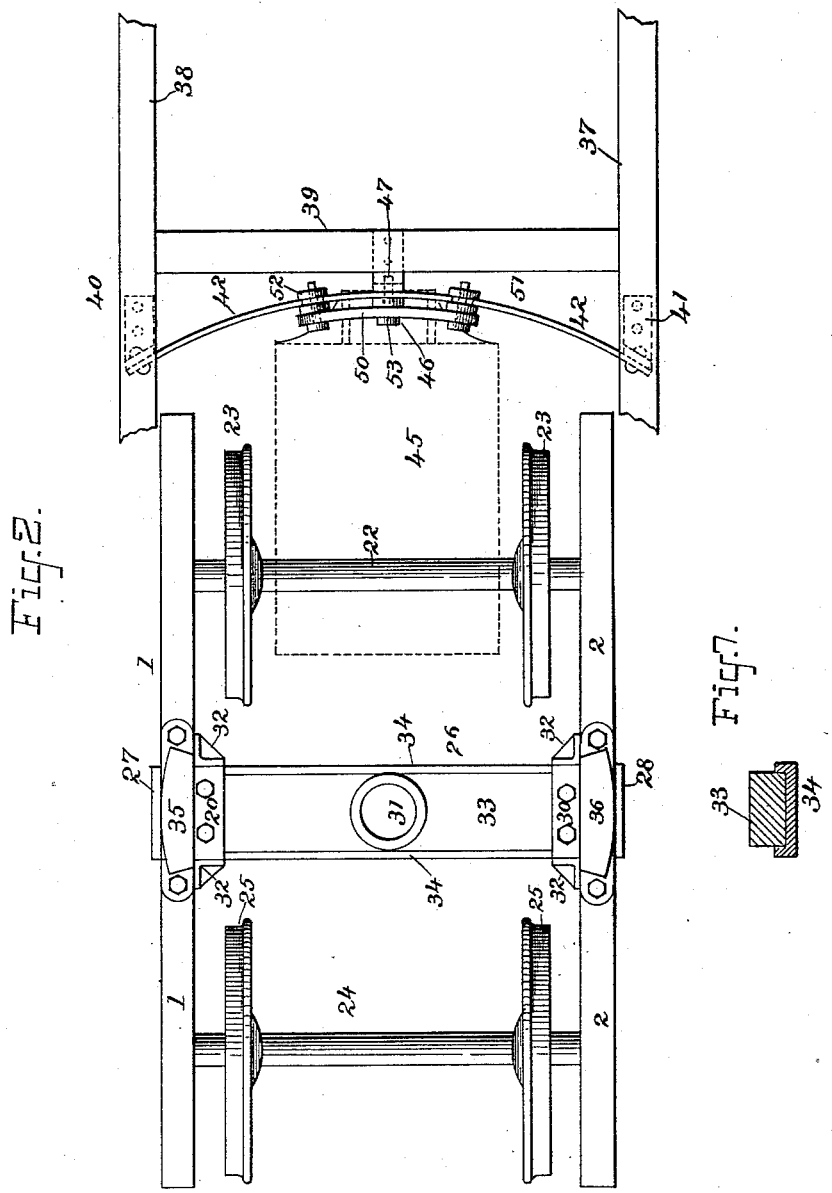

(No Model.) 4 Sheets—Sheet 3.

G. M. BRILL.
MOTOR TRUCK.

No. 458,216. Patented Aug. 25, 1891.

ATTEST:
Herbert F. _____
Henry L. Brevoort

INVENTOR:
George Martin Brill

By Joseph L. Levy
Attorney (No Model.) 4 Sheets—Sheet 4.

G. M. BRILL.
MOTOR TRUCK.

No. 458,216. Patented Aug. 25, 1891.

ATTEST:
Herbert F. Dubin
Henry L. Brevoort

INVENTOR:
George Martin Brill
By Joseph L. Levy
Attorney

THE NORRIS PETERS CO., PHOTO-LITHO., WASHINGTON, D. C.

UNITED STATES PATENT OFFICE.

GEORGE MARTIN BRILL, OF PHILADELPHIA, PENNSYLVANIA.

MOTOR-TRUCK.

SPECIFICATION forming part of Letters Patent No. 458,216, dated August 25, 1891.

Application filed May 11, 1891. Serial No. 392,255. (No model.)

*To all whom it may concern:*

Be it known that I, GEORGE MARTIN BRILL, a citizen of the United States, residing in Philadelphia, in the county of Philadelphia and State of Pennsylvania, have made a new and useful Improvement in Motor-Trucks for Cars, of which the following is a specification.

My invention particularly relates to pivotal car-trucks adapted to support a motor. The general practice is to support but one motor upon a truck and to so locate the motor as to get the largest amount of traction possible due to its weight. As a result of this practice efforts have been made to bring the weight of the motor upon the wheel of the axle to which the motor is connected, or, as it is commonly termed, the "driving-wheel." This cannot be advantageously done in pivotal car-trucks by reason of the fact that unless the truck is specially adapted for this purpose one end of the same will lift or jump, pounding, destruction of the axle, and derailment thereby often ensuing.

Another disadvantageous feature in the carrying of motors upon trucks is the space which they occupy, thus interfering with the brake mechanism, which forms a very important feature of the truck system and the consequent close proximity of the brake mechanism to the motor. This close proximity often results in an induced current being formed in the brake mechanism, which materially affects the efficiency of the motor; also, trucks which have laterally been constructed for the purpose of carrying motors have been necessarily heavy and expensive, occupying a great deal of room and becoming easily deranged. In this class of trucks it is also a very desirable feature to have as short a wheel-base as possible in order to permit the car to round curves of comparatively short radii without jar or danger of derailment. Where one motor has been carried upon the truck it has been usual to make a compartively long wheel-base for the purpose of supporting the motor within or between the axles of the truck. This does not permit the use of a very short wheel-base, so that by reason of the suspension of the motor between the axles a long wheel-base has to be used and with it the consequent disadvantages which are encountered. By my invention I have endeavored to overcome these difficulties. I use a pivotal truck and secure cheapness and compactness by reason of its peculiar structure, and I further secure the benefits which may be derived from the use of a very short wheel-base, for such my truck is to be. I furthermore do away with the inconvenience resulting from the suspension of the motor between the axles of the truck by sleeving the motor to what is termed the "driving-axle," extending the nose of the same out beyond it—that is, away from the center of the truck—and pivotally supporting the same from the car-body, providing the car-body therefor with devices whereby the motor can swing with the truck when the normal positions of the truck and car-body change. Again, by my structure I do away with the necessity of having a continuous upper chord. The upper frame of my truck consists simply of two longitudinally-disposed beams, which I call "wheel-pieces" and which are united laterally by the bolster, thereby leaving a free and open space between the ends of the frame and bolster, and also below it, wherein clear space can be had for the location of motors, grip, and brake mechanism. The bolster is rigidly secured to the wheel-pieces, and the truck-springs are set between the wheel-pieces and the axle-boxes, they being supported by a lower chord connected with the ends of the wheel-pieces. I therefore do away with the rigging necessary for the purpose of spring-supporting the bolster on the truck-frame, and the bolster may be made of such depth as to be only flush with the top and bottom of the wheel-pieces and not project below them, so that an absolutely clear space for the purposes before set forth may be had. I have shown the bottom as projecting below the wheel-pieces; but this is done to get great strength, and it is obvious that should this general structure be embodied in a rigid or non-pivotal truck, or should less strength of bolster be desired, it could be made flush with the wheel-pieces.

My invention further consists in the details of construction and in the combination of parts hereinafter set forth.

Figure 5:
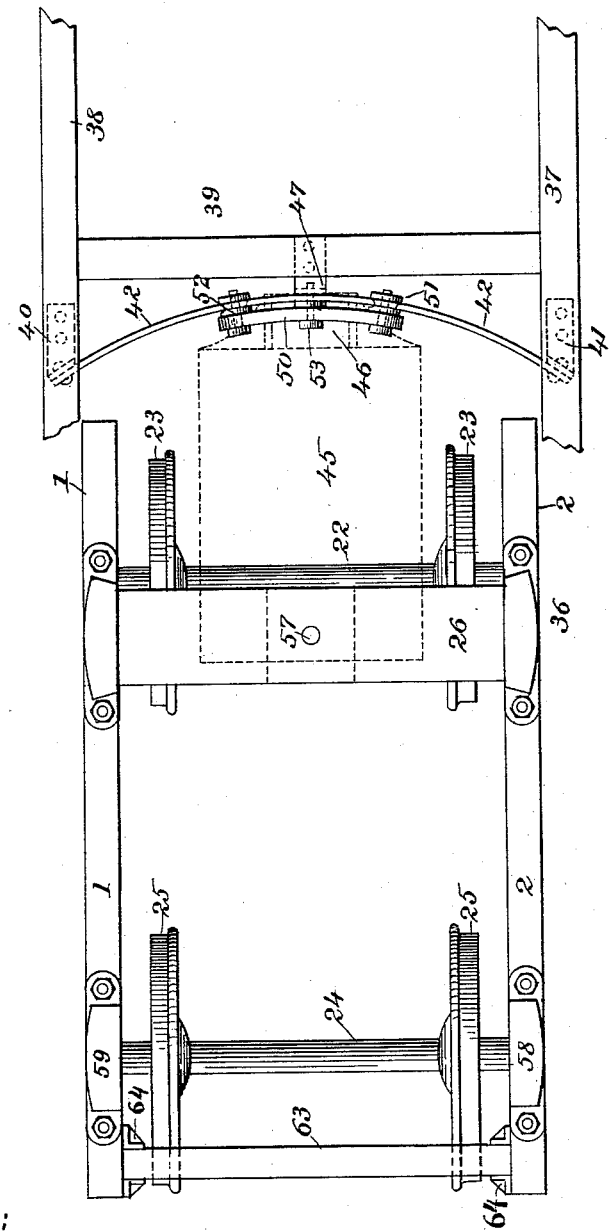

In the drawings, Figure 1 is a side elevation of the truck and portion of the car-body, showing the truck pivotally connected thereto and the free end of the motor suspended therefrom. Fig. 2 is a plan view of the same, showing a portion only of the car-sills and the track for the motor-support. Fig. 3 is a front elevation of the motor-trolley and track. Fig. 4 is a side elevation of the truck and car with the pivotal center of the same placed nearly over the driving-wheel. Fig. 5 is a plan view of Fig. 4.

I will first describe my truck-structure, which is the same, with one exception, in all the views.

The framing of the truck comprises two longitudinally-extending beams 1 and 2, which are termed "wheel-pieces." These wheel-pieces form in conjunction with the lower chord 3, which is secured to the wheel-pieces by the bolts 4, the side frame of the truck. These wheel-pieces are preferably constructed, as shown in Fig. 6, where it will be seen that the main portion of the beam 5 is of wood configured to receive the channel-plates or re-enforcing members 6 7, which may be united together by bolts or in any other desired manner. This structure gives great strength and rigidity at but very little cost and weight. The ends of the channel-plates 6 7 could be made to meet, if desired; or, instead of being disposed, as shown, they could be disposed along the sides or reversed. Secured to the bottom of the wheel-pieces 1 2 are the spring-plates 9 10, which receive the spring-posts 11 12 13 14. These posts are secured to the spring-plates and to the lower chord in the usual manner. The axle-boxes 15 and 16 are secured to the lower chord 3 and have extending therefrom spring-seats 17 18 19 20, upon which the springs 21 are situated.

At 22 is the axle, and 23 the wheel of what is termed the "driving-wheel," by reason of the fact that the motor is sleeved upon its axle and power applied thereto in any desired manner. 24 25 are what may be termed the "truck" or "trailing axle" and wheel, the axle 24 finding bearings in the axle-box 15. Although the axle 24 and wheel 25 are termed the "truck" or "trailing axle" and wheel, under certain conditions they may be the leading axle and wheel. Therefore, I do not intend to confine myself to the direction that the wheels shall travel, as hereinbefore set forth, as they may be made to move in either direction—that is, the trailing or truck wheel first or the driving-wheel first, the term "driving-wheel" being used simply to locate the wheel to which the motive is applied. The wheel-pieces 1 2 are united laterally by the bolster 26. The bolster is supported upon the wheel-pieces by means of the straps 27 28, which pass over the wheel-pieces inclosing them, and which are secured to the bolster by means of the bolts 29 30. The center plate 31, of any desired structure, is located upon the bolster. In this case the center plate is the female. The longitudinal wheel-pieces and transversely-extending bolster rigidly secured to the wheel-pieces, together with the lower chord on each wheel-piece from the main framing of the truck, and by reason of the interposition of the springs between the axle-boxes and the wheel-pieces, the weight of the car can be transferred from the center plate on the bolster to the springs, thereby spring-supporting the car-body upon the axle-boxes alone, instead of upon the truck-bolster, springs, or truck-bolster and axle-box springs together.

To provide for the lateral strain which will be brought to bear upon the truck-frame, I secure angle-irons 32 in the angles formed by the bolster and wheel-pieces, rigidly securing one to the other, and enabling them to resist lateral strain or wrenching. This method of securing the bolster to the wheel-pieces enables me to do away with any end beams connecting the wheel-pieces of the frame, by the elimination of which I secure a free and clear space for the location of the motor, brake appliances, and other truck accessories, as before set forth, besides making a very economical truck.

The bolster is preferably constructed, as shown in Fig. 7, where the main body thereof is comprised of wood 33, cased and supported in a channel-beam 34, or re-enforcing member which covers the bottom of the wooden beam 33 extending for a short distance up its sides. The beam 33 may be secured to the beam 34 by bolts or otherwise. This arrangement greatly strengthens the bolster, and may be used, if desired, and I prefer to use it in this structure.

Upon the wheel-pieces are secured the truck side bearings 35 36.

At 37 38 are shown the longitudinal sills of the car and at 39 one of the lateral girders. To one of the lateral girders, or to any other suitable part of the car-body, is secured a male center plate 43, which enters the female center plate 31, as shown in dotted lines in Fig. 1.

To the sills 37 of the car-body are secured the car side bearings 44, adapted to coact with the truck side bearings 35. By this arrangement the car-body and truck are pivotally united.

As before set forth, my invention extends to the disposition and support of the motor. Where but one motor is used on a single truck, a short wheel-base is very advantageous for the sake of economy and compactness and for many other reasons. This cannot be advantageously obtained if the motor is to be disposed between the wheels, because of its length. By disposing the motor in accordance with my invention I am enabled to use a truck of comparatively very short wheel-base, and thereby realize all the advantages due to such a structure. In accordance with this I sleeve the motor 45 to the axle 22, and extend the nose or free end 46 out from it, thereby locating it outside of the axles instead of between them. The motor, being secured at one end to the truck, partakes of all its changes of position in relation to the car-body. If the free end of the motor were extended, as shown, and supported upon the truck-frame or any other portion of the truck, it would leave the same in an unbalanced condition and means would have to be adopted to counterbalance the other end. By my invention such a contingency cannot arise by reason of the fact that the major portion of the weight of the motor is thrown upon the axle to which it is sleeved or is sustained by the support for the free end. This is one of the main advantages of the method of supporting the free end of the motor in accordance with my invention, and I proceed as follows to obtain it: Secured to the sills 37 38 of the car are angle-pieces 40 41, to which the segmental track or way 42 is fixed at its ends. It is braced and supported at the center by being secured to angle-pieces 47, fixed to the transverse girders 39. The center of the truck center plate, or, in other words, the pivotal center of the truck, is the point from which the line determining the way 42 should be struck. A trolley 48, comprising a depending shank or spindle 49 and a horizontally-disposed wheel-plate 50, is secured either flexibly or rigidly to the nose 46 of the motor at one end, and at the other movably supported on the way 42 by means of the trolley-wheels 51 52 53, which are rotatably secured to the wheel-plate. These wheels both support the free end of the motor and girder and preserve the trolley on the way. If the connection of the trolley and motor is to be rigid, the shank will then be provided with a screw-thread 54, and a hole formed in the nose of the motor, and the shank being passed through it can then be secured by the bolts 55 56. I do not intend to limit myself to this form of support, as any other form whereby the motor can be supported in accordance with my invention may be used. Nor do I limit myself to locating the pivotal center of the truck in the center thereof, for, as has before been set forth, the question of traction in motor-propelled trucks is a very important one, and I have found that by locating the pivotal center over or substantially over the axle of the driving-wheel and by adjusting the car and truck rub-plates or side bearings in relation to the truck and car center plates or bearings, so that almost all of the weight of the car will fall on the rub-plates instead of the center-plates, I can advantageously apply the weight of the car to supplement the weight of the motor to increase the tractive power of the truck. A structure whereby these results can be accomplished is illustrated in Figs. 4 and 5. There the structural characteristics of the truck and motor support are the same.

At 26 is a bolster, which may be constructed as shown in Fig. 7, or in any other suitable manner, which is secured to the wheel-pieces 1 and 2, room being left to accommodate the wheels, and upon the bolsters are fixed the truck side bearings 61 62. The bolster is located so as to bring the pivotal center of the car almost directly over the axle of the driving-wheel, and if the weight of the car is taken on the wheel-pieces and through the springs and axle-boxes brought upon the driving-wheels the tractive power of the truck will be increased. The pivotal center is indicated at 57.

The car body and truck may be pivotally united by center plates and king-bolts, or as shown in the patent to G. M. Brill and G. A. Brill, dated May 13, 1890, No. 427,966, in which the center bearings are disposed on the sides of the truck for the purpose of getting a clear and free space within its framing.

To provide against the rising of the end of the truck opposite to that upon which the motor and pivotal center are located, I place bearings or rub-plates, which I shall term "end rub-plates" to distinguish them from the side bearings 35 36. The truck and rub-plates 58 59 are located a suitable distance away from the pivotal center, and the car is provided with like rub-plates 60, (but one is shown,) adapted to engage with the truck end rub-plates. In this arrangement the side bearings 61 62 are not given the same dimensions as in the structure shown in Figs. 1 and 2, the truck side bearing 62 being higher and the car side bearing 61 correspondingly reduced to get the proper disposition of weight, as before set forth. In this arrangement, on account of the disposition of the bolster, as shown, there is apt to be a wrenching or spreading strain brought on the wheel-pieces, and to brace these I connect them at the rear end by the transverse beam 63. This may be of any suitable structure and united to the wheel-pieces by the angle-pieces 64. The position of the beam 63 shown in the drawings is not absolutely necessary, for it may be otherwise located to prevent the wheel-pieces spreading.

I claim—

1. The combination of a car-body pivotally supported on a truck, the truck having longitudinally-extending wheel-pieces united by a transversely-extending beam and having free and open ends, axle-boxes secured to said wheel-pieces between their ends and the bolster, wheels and axles set in axle-boxes, and a motor secured to one of the axles within the free and open space, one end of which is sleeved to one of the axles, the nose or free end of which is extended outwardly away from the center of the truck and is movably supported from the car-body, substantially as described.

2. The wheel-pieces 1 and 2, comprising the beam 5, re-enforcing plates 6 and 7, secured thereto, and a transversely-disposed beam uniting the said wheel-pieces, said beam comprising the beam 33, supported in channel-beam 34, said beam thus forming the bolster of the truck, and straps 27 28, extending around the wheel-pieces and over the ends of the bolster, said straps being secured to the bolster by bolts 29 30, substantially as described.

3. The wheel-pieces 1 and 2, comprising a beam 5, re-enforcing plates 6 and 7, secured thereto, and a transversely-disposed beam uniting the wheel-pieces, comprising the beam 33, supported in the channel-beam 34, said beam thus forming the bolster of the truck, and straps 27 28, extending around the wheel-pieces and over the ends of the bolster, said straps being secured to the bolster by straps 29 30, and angle-pieces 32 for securing the bolster to the wheel-pieces, substantially as described.

4. The wheel-pieces 1 and 2, comprising a beam 5, re-enforcing plates 6 and 7, secured thereto, a lower chord 3, secured to the wheel-pieces at their ends, and running-gear and springs secured between the wheel-pieces and said lower chord, a transversely-disposed beam uniting the said wheel-pieces, comprising the beam 33, supported in the channel-beam 34, said beam thus forming the bolster of the truck, and the straps 27 28, extending around the wheel-pieces and over the ends of the bolster, said straps being secured to the bolster by bolts 29 30, substantially as described.

5. A motor supported at one end upon a truck and extending outwardly from the center thereof and means for supporting the free end of the motor, said means being independent of the truck or its framing, substantially as described.

6. In a pivotal car-truck, the combination of a motor sleeved on the truck or its frame at one end and a car-body provided with supports for the free end of the motor, which supports permit the motor to move with the truck and radiate in relation to the car-body, substantially as described.

7. A motor sleeved on the axle of a truck or a part of its framing, an upwardly-extending support secured to the free end or ends of the motor, a car-body pivotally secured to the said truck, and devices secured to the car-body, comprising an upwardly-extending support for hanging the motor and permitting the said support to move laterally of the car-body, substantially as described.

8. A truck, a car-body pivotally secured to said truck, a rail secured to said car-body and disposed within the arc of a circle struck from the pivotal center of the truck, a motor sleeved to the axle of the truck, and devices for supporting the free end of the motor secured to its free end and movably supported upon said way or rail, substantially as described.

9. In a motor-truck, a motor sleeved to one of the axles of the truck, a car-body pivotally supported upon said truck, said pivotal support being located between the actual center of the truck and the center of the axle upon which the motor is sleeved, the said motor extending outwardly away from the center of the truck, devices for movably supporting the free end of the motor, secured to the car-body and car and truck, and end rub-plates located on the truck and car-body, which are adapted to balance the end of the truck opposite to that upon which the motor is sleeved, substantially as described.

10. A car having longitudinally-extending wheel-pieces, a bolster rigidly affixed to the said wheel-pieces, a free and open space between the wheel-pieces and bolster and the end of the truck, running-gear secured to the said wheel-pieces within the bolster and ends of the truck, a motor sleeved to one of the axles within the said free space, its free end extending away from the center of the truck, a car-body pivotally supported upon said bolster, and means for movably supporting the free end of the motor secured to the car-body, substantially as described.

11. In a car-truck, longitudinally-extending wheel-pieces, running-gear secured to the wheel-pieces, a bolster rigidly affixed to the wheel-pieces and connecting them, a motor supported upon the running-gear of the truck, the nose or free end of which extends away from the center of the truck, a car-body pivotally supported upon said bolster, said bolster and pivotal center being located between the wheel-pieces and the running-gear, side bearings on the wheel-pieces, corresponding bearings on the car-body, said bearings being adapted to take the weight of the car and transfer it to the springs instead of the bolster, and means for supporting the free end of the motor movably secured on the car-body, substantially as described.

12. In a car-truck, a car-body and a truck pivotally secured to each other, a motor sleeved to one of the axles and secured outwardly from the center of the truck, said motor having a lug or extension 46, a truck or way 42 secured to the car-body, said way being disposed upon the arc of a circle struck from the pivotal center of the car-body and the truck, and a trolley for movably supporting the motor from the car-body, comprising the spindle 49, which is secured in the projection 46 of the motor, a longitudinally-extending trolley-plate 50, wheels 51 52, secured to said plate above the rail 42, and a wheel 53, secured upon said plate and in contact with the lower surface of said rail, the plate 50 and spindle 49 being integral, substantially as described.

13. A motor-propelled vehicle having a truck of the class herein described pivotally secured thereto, the ends of the car overlapping the ends of the truck, a motor supported upon the truck and extending out from the ends of the same, and a movable support for the free end of the motor secured to the car-body at a point past the end of the truck, substantially as described.

GEO. MARTIN BRILL.

Witnesses:
R. HAWKINS,
R. T. REED.